United States Patent [19]

Song

[11] Patent Number: 4,993,767
[45] Date of Patent: Feb. 19, 1991

[54] DETACHABLE HANDLE FOR CONTAINERS

[76] Inventor: Chin H. Song, 814 S. Hobart Ave., Apt. 201, Los Angeles, Calif. 90005

[21] Appl. No.: 478,285

[22] Filed: Feb. 9, 1990

[51] Int. Cl.⁵ ............................................. B65D 25/28
[52] U.S. Cl. .................................. 294/31.1; 220/94 R
[58] Field of Search ........................... 294/34, 31.1, 28; 248/312.1, 316.2, 689, 688, 231.3, 113, 145.6; 16/114 R; 220/94 R, 90

[56] References Cited

U.S. PATENT DOCUMENTS

| | | | |
|---|---|---|---|
| 2,288,359 | 6/1942 | Jenkins . | |
| 2,493,751 | 1/1950 | Davis | 294/33 |
| 2,564,043 | 8/1951 | Ward | 248/113 |
| 2,676,832 | 4/1954 | Keiter . | |
| 2,786,707 | 3/1957 | Campbell | 220/94 R |
| 2,873,044 | 2/1959 | Rutledge, Sr. | 220/94 R |
| 3,024,057 | 3/1962 | Lockwood | 294/34 |
| 3,304,112 | 2/1967 | Elliott . | |
| 4,164,300 | 8/1979 | Raczynski et al. | 220/94 R |

Primary Examiner—Johnny D. Cherry
Assistant Examiner—Cathleen Pringle
Attorney, Agent, or Firm—Nilsson, Robbins, Dalgarn, Berliner, Carson & Wurst

[57] ABSTRACT

The u-shaped detachable handle, for use with paint cans and other receptacles having bails, has a base plate, a connecting plate and a grip extending horizontally above the base plate. The handle is anchored to the receptacle by a rim hook which engages with the receptacle rim and a cam latch mounted to the lower surface of the base plate which seats against the receptacle wall. The handle is also anchored by the receptacle bail which is received by a hook formed at the remote end of the handle. A handle cover surrounding the grip cushions the detachable handle.

10 Claims, 2 Drawing Sheets

DETACHABLE HANDLE FOR CONTAINERS

BACKGROUND OF THE INVENTION

The present invention relates to detachable handles for containers, and more particularly, to a detachable handle for use with paint cans and other receptacles having bails.

Many paints are contained in cans having a thin wire bail for a handle. Although a wire bail provides an adequate handle for a paint can, bails can inhibit access to the interior of the paint can and, after some time, reduce circulation in the painter's hand. To access the interior of a paint can, the painter must either dip the brush into the paint can on either side of the bail held vertically or support the paint can from the bottom and hold the bail away from the center of the paint can. Additionally, the thin wire nature of most paint can bails distributes the weight of the paint can over a small area when the bail is held in the painter's hand. Thus, the thin bail can cut off circulation in the painter's hand if a heavy can is held for a long period of time.

A full one gallon paint can weighs approximately twelve pounds. Therefore, a detachable handle for a paint can is needed which will support a heavy container vertically, hold the bail away from the center of the container, and allow the user to easily hold a heavy container for extended periods of time.

Jenkins U.S. Pat. No. 2,288,359, discloses a detachable handle which attaches to the upper and lower flanges of a typical container. This handle allows paint to be poured from the container easily. However, when the user holds the paint can by the Jenkins' handle, the support for the paint can shifts from above the center of mass of the container to a point on a plane parallel to the longitudinal axis of the paint can. The shifting of the paint can support increases the magnitude of the torque applied to the paint can. Therefore, use of the Jenkins' handle requires the user to bear the weight of the paint can with the forearm muscles to counteract the increase in torque and retain the paint can in a substantially upright or vertical position. When the Jenkins' handle is used, the user must keep his or her forearm substantially perpendicular to his or her body. If the forearm is relaxed, the paint will spill from the container.

Elliott U.S. Pat. No. 3,304,112, discloses a detachable handle which attaches to the rim of a receptacle. The device includes a pair of elongated, metal, superposed plates which reciprocate relative to each other for the purpose of engaging and disengaging the rim of a receptacle. The inner end of the upper plate ends in a rim hook which hooks over, around and under the receptacle rim. The inner end of the lower plate ends in a rounded flange extending perpendicularly to the lower plate for contacting the outer wall of the receptacle. A latching device is provided at the remote end of the upper plate to restrict the relative movement of the lower plate. When the latching device is engaged, the rim hook and the rounded flange clamp between them the wall and rim of the receptacle. A pair of up-turned lips extending from the opposite sides of the lower plate overlie the upper plate. The lips confine the reciprocating movement of the plates to a direction parallel to their mutual longitudinal axes. The Elliott handle relies solely on the rounded flange of the lower plate and the rim hook of the upper plate to secure the handle to the receptacle. Thus, the remote end of the handle is not anchored to the receptacle and the Elliott handle may bend upward under the weight of a heavy paint can. Further, the edges of the metal plates used in the Elliott handle may cut into the user's hand when the handle is used for an extended period of time.

Therefore, it is desirable to provide a well anchored detachable handle which allows a paint can to be held vertically for extended periods of time. A detachable handle is needed which reduces the magnitude of the torque on the paint can while retaining the bail away from the center of the container. The present invention supports the paint can vertically with a handle above the center of mass of the paint can, thus allowing the user to substantially relax his or her forearm without spilling paint. The disclosed invention also provides a dual anchored handle which is easily held for extended periods of time and does not interfere with access to the paint within the container.

SUMMARY OF THE INVENTION

The present invention comprises a u-shaped detachable handle for a paint can or other receptacle having an open top, a bail, a cylindrical wall and a rim circling the top of the wall. The legs of u-shaped handle are formed by a base plate and a gripping member joined by a connecting member. The present invention also includes: a rim hook connected to the remote end of the base plate whereby the rim hook is formed to curve around the paint can rim to hold the base plate in a substantially horizontal position relative to the longitudinal axis of the paint can; a bail hook attached to the remote end of the gripping member and formed to project perpendicularly with respect to the horizontal plane of the gripping member whereby the receptacle bail is receivable by the bail hook such that the bail is positioned substantially above the paint can rim; and a cam latch pivotally mounted to the lower surface of the base plate and having an end adapted to rotate into engagement with the paint can wall and to squeeze the wall and rim between the rim hook and the cam latch end.

In a preferred embodiment, the present invention provides a strong, soft handle which attaches to the rim of a receptacle. A handle covering placed around the gripping member to provide padding. This allows a paint can to be carried for extended periods of time without cutting off the user's hand circulation.

BRIEF DESCRIPTION OF THE DRAWINGS

These and other features of the present invention may be more fully understood from the following detailed description, taken together with the accompanying drawings, wherein similar reference characters refer to similar elements throughout and in which.

DETAILED DESCRIPTION OF THE DRAWINGS

Figure 1:
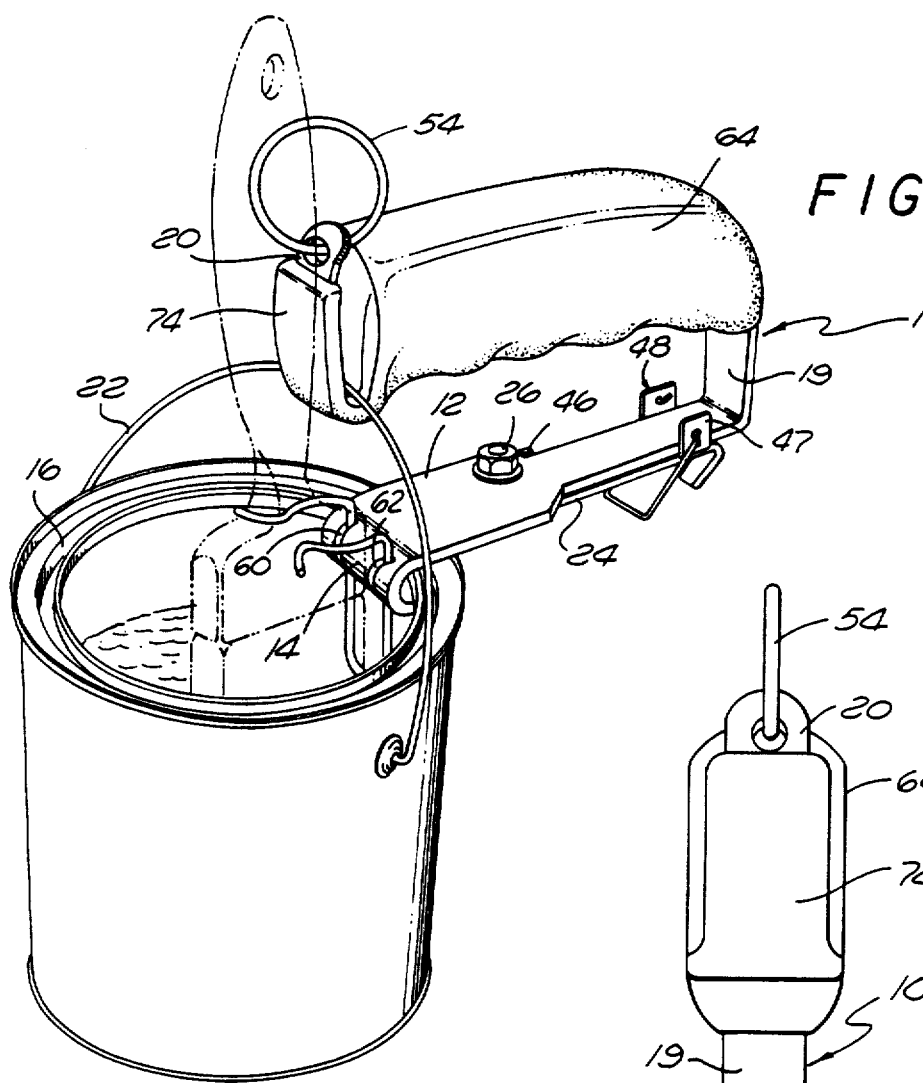
FIG. 1 is a perspective view of a removable handle engaged with a receptacle.

Referring to FIG. 1, a preferred embodiment of a detachable handle constructed according to the present invention has a unitary, generally u-shaped frame 10 constructed of metal. The frame is constructed of a material with sufficient strength and dimension to retain its form while supporting paint cans of approximately twelve pounds or more. In a preferred embodiment the frame is constructed of aluminum or steel, to prevent bending and deterioration of the frame, and with a width and thickness of approximately five-eighths inch and one-eighth inch, respectively.

The lower leg of the unitary frame 10 forms a base plate 12. The inner end of the base plate ends in a rim hook 14 which curves below the base plate and is adapted to hook over, around and under a can rim 16. The upper leg of the u-shaped frame 10 forms a gripping member 18 (FIG. 4) integrally joined at its outer end to the outer end of the base plate 12 by a connecting member 19. The plane of gripping member 18 is parallel to and above the plane of the base plate 12 when the detachable handle is connected to a vertical paint can. A bail hook 20 is formed at the inner end of the gripping member 18 and extends perpendicularly with respect to the longitudinal axis of the gripping member 18 for receipt of a paint can bail 22.

When the bail 22 is received within the channel formed by the bail hook 20, the bail 22 provides support for the gripping member 18 by anchoring the inner end of the gripping member 18 above the rim hook 14. The bail supports the gripping member 18 from bending away from the base plate 12 under the strain of a heavy paint can. Additionally, the connection of the bail 22 and the bail hook 20 creates a diagonal lever extending between the handle and the paint can. This lever increases the painter's leverage over the paint can.

A linear cam latch 24 is pivotally mounted on the base plate 12 by a bolt 26. The cam latch 24 is in a plane parallel to and below the plane of the base plate 12. The cam latch 24 is a rectangular plate constructed of steel or other hard metals which resist bending and twisting when the cam latch is rotated against the side of a paint can. The bolt 26 mounts the cam latch 24 to the base plate 12 adjacent to the outer end of the rectangular plate cam latch 24 (FIG. 5).

Figure 4:
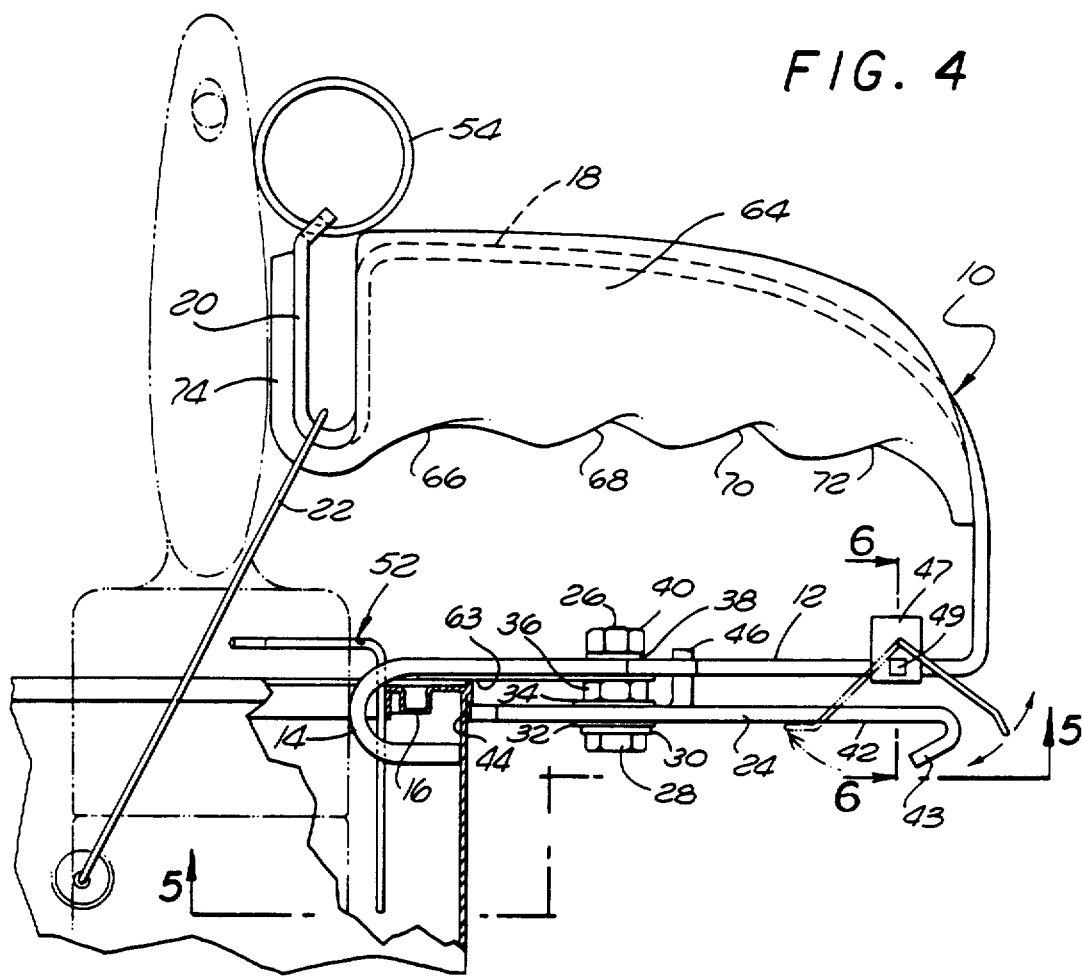
FIG. 4 is a perspective view of the present invention with the gripping member ghosted.

Referring to FIG. 4, the bolt 26 is threadibly mounted between the base plate and the cam latch with a bolt head 28 secured to the lower surface of the cam latch 24 by means of a first lock nut 30 and a first washer 32. A second washer 34 and a first nut 36 are threadibly engaged with the bolt 26 between the lower surface of the base plate 12 and the upper surface of the cam latch 24. Finally, the bolt 26 is secured to the upper surface of the base plate 12 by a second lock nut 38 and a second nut 40.

An elongate bar forms a hilt 42 integral with the cam latch 24, at the outer end of the cam latch 24 and extending parallel to the base plate 12. The hilt 42 is hooked at its remote end to extend below the lower surface of the cam latch 24. Hilt 42 provides a thumb latch 43 which may be clasped for rotating the cam latch 24.

Figure 5:
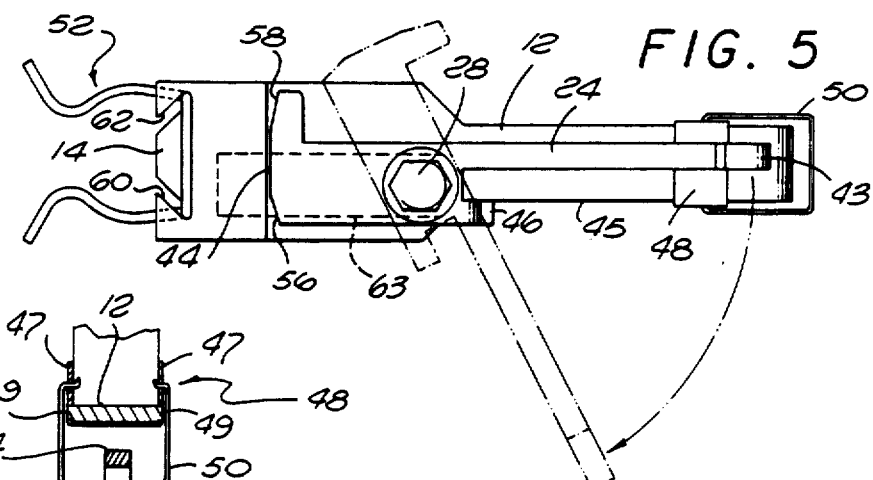
FIG. 5 is a plan view taken along the line 5—5 of FIG. 4.

As shown in FIG. 5, when the detachable handle is mounted on a paint can and the cam latch is in a closed position, the longitudinal axis of the cam latch 24 is parallel to the longitudinal axis of the base plate 12. Conversely, when the cam latch is rotated to an open position, the cam latch longitudinal axis is oblique to the longitudinal axis of the base plate.

Referring to FIG. 4, to mount the detachable handle on a paint can, the bail 22 is received by the bail hook 20. The rim hook 14 is then placed over the can rim 16 and the handle is drawn away from the center of the paint can to secure the rim hook 14 against the can rim 16. The cam latch 24 is then rotated to the closed position to seat a lock edge 44, formed by the inner end of the rectangular plate of the cam latch 24, against the outer wall of the paint can. In the closed position, the detachable handle clamps the paint can wall and rim between the cam latch and the rim hook.

A stop 46 formed by an arcuate flange is integral with the cam latch 24 adjacent to the outer end of the rectangular plate and parallel to the hilt 42 (FIGS. 4 and 5). The flange is bent upwardly from the cam latch 24 to form the stop 46. When the lock edge 44 of the cam latch 24 is fully seated against the paint can, the stop 46 rests against the edge 45 of the base plate 12 to prevent further rotational movement of the cam latch 24.

Figure 6:
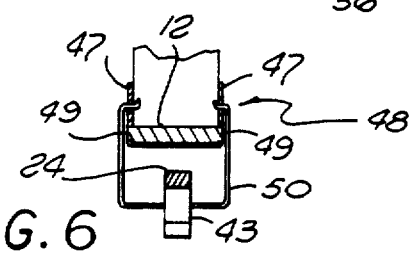
FIG. 6 is a partial elevational view taken along the line 6—6 of FIG. 4.

Referring to FIG. 1, a u-shaped support 48 is mounted on the base plate 12 adjacent to the connecting member 19. The bridge of the support 48 passes under the base plate 12 and its legs 47 project upwardly on either side of the base plate 12. As is shown in FIG. 4, small flanges 49 extend from each side of and in the plane of the base plate 12 to secure the support 48 against the edge of the base plate by engaging apertures in the legs 47. A u-shaped safety hook 50 is pivotally mounted at each end on a leg 47 of the support 48 to pivot downwardly and over the cam latch hilt 42 when the cam latch is in the closed position (FIG. 6). Once the safety hook 50 is engaged over the cam latch hilt 42, the safety hook 50 prevents the rotational movement to open the cam latch 24 shown in FIG. 5.

A circular hanging ring 54 is removably mounted in the inner end of the bail hook 20 (FIG. 1). The hanging ring 54 may be used to suspend the detachable handle from a hook or other means, yet retain the paint can in a substantially upright position.

Figure 2:
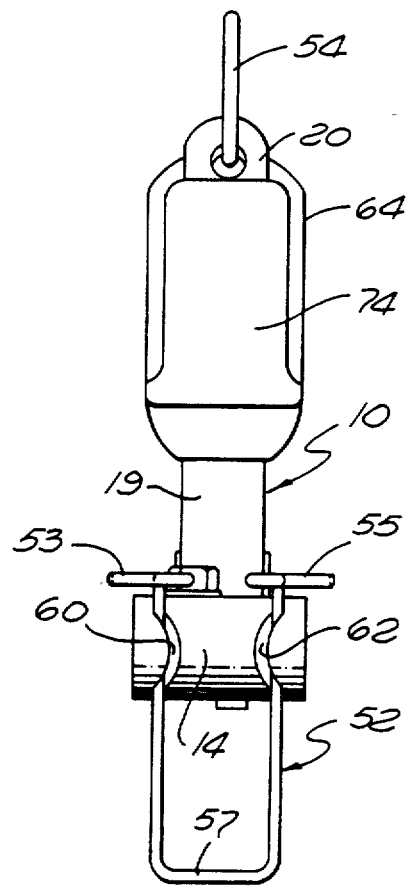
FIG. 2 is an elevational view of the embodiment of the invention shown in FIG. 1 from the inner end.
Figure 3:
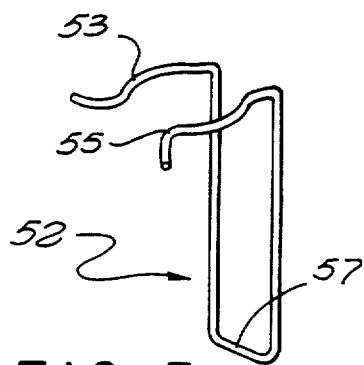
FIG. 3 is a perspective view of a detachable brush clip.

As is shown in FIG. 3, a u-shaped detachable, integral brush clip 52 defines two arcuate fingers 53 and 55 joined by a connecting rod 57. The clip 52 is adapted to hold the ferrule of a paint brush (FIG. 1). The brush clip 52 may be mounted in angled slots 60 and 62 formed in the curve of the rim hook 14 (FIG. 2). The brush clip may be constructed of flexible metals or other materials which retain their original shape despite the application of moderate force. Thus, the fingers may be compressed together without distorting the shape of the brush clip.

FIG. 5 shows the slots 60 and 62 for supporting the brush clip 52, and as well as the details of the cam latch as seen from below the lower surfaces of the rim hook, the base plate and the cam latch. The cam latch 24 is pivotally mounted between the inner edge and the center of the base plate 12. The off-center mounting of the cam latch 24 allows one corner of the lock edge 44 of the cam latch 24 to be slightly rounded for contact with the wall of a paint can without puncturing the paint can when the cam latch is rotated into its fully seated position.

One corner of the lock edge 44 is a rounded edge to form arcuate portion 56. The arcuate portion 56 is the first point of the lock edge 44 to meet the paint can when the cam latch 24 is rotated to a closed position and it serves to ease the initial engagement of the cam latch with the paint can. The rounding of the squared corner shortens the cam latch lock edge 44 by approximately one-eighth of an inch.

An angled flange 58 projects from the opposite corner of the locked edge 44 of the cam latch 24 at an angle of approximately eight degrees away from the locked edge 44. The angled flange 58 lengthens the lock edge 44 and acts against the rotational force of the cam latch 24 to retain the cam latch in a fully seated position.

Two u-shaped, angled apertures or slots 60 and 62 are formed by cuts in the rim hook 14 at angles slightly toward each other (FIG. 2). The base of each u-shaped slot is formed at the edge of the rim hook, while the legs of each slot curve up or down with the rim hook and angle toward the nearest edge of the rim hook. The distance between the ends of the legs of the first slot 60 and the ends of the legs of the second slot 62 is approximately the distance between the fingers of a brush clip. Therefore, the distance between the bases of the slots is less than the distance between the fingers of a brush clip.

A brush clip may be inserted into the slots 60 and 62 by compressing the brush clip fingers together and inserting the brush clip in the base of each u-shaped slot 60 and 62. The angled nature of the slot legs allows the brush clip fingers to expand to their original shape once the brush clip is pushed through the slots and seated against the ends of the slot legs.

As is shown in FIGS. 4 and 5, a thin, reinforcing washer 63 is mounted between the base plate 12 and the first nut 36. The reinforcing washer 63 is generally rectangular, with approximate length and width of one and a half inches and one-half inch, respectively. The reinforcing washer is mounted to extend along the inner surface of the base plate from the bolt 26 to beyond the junction of the base plate 12 and the rim hook 14. The reinforcing washer is carbite or carbon steel to reinforce the junction between base plate 12 and the rim hook 14 against wear when the detachable handle is repeatedly mounted on a paint can.

FIG. 4 shows a generally cylindrical soft handle cover 64 surrounding the metal gripping member 18 and extending towards the base plate 12 to cover the interior portion of the gripping member. Between the interior portion of the gripping member 18 and the handle cover 64 is a flexible material, generally neoprene, nitrile or another compressible padding secured to the gripping member by the encircling handle cover 64. The handle cover 64 is a light-weight nylon fabric, generally Rubatex with a thickness of approximately one-fourth inch. The handle cover and compressible padding are shaped to form four finger notches 66, 68, 70 and 72 in the surface closest to the base plate 12. The soft, flexible nature of the handle cover allows the user to hold a heavy can for extended periods of time without the detachable handle cutting off the circulation in the user's hand.

A handle cover flap 74 extends from the lower surface of the handle cover 64 and over the outside surface of the bail hook 20. The addition of the handle cover flap 74 provides a soft surface for the user's index finger, if the handle is held with the index finger curling around the bail hook 20.

Although described for purposes of clarity with regard to specific preferred embodiments, the present invention is not limited to those embodiments but rather is applicable broadly to all versions falling within the scope and spirit of the appended claims. For example, the hanging ring may be omitted from the bail hook and the brush clip and slots may be omitted from the rim hook. Alternative sizes of brush clips may be utilized to hold different varieties of paint brushes. Additionally, many other devices may be used to pivotally mount the cam latch to the base plate.

I claim:

1. A detachable handle for a receptacle having an open top, a bail, a lateral cylindrical wall and a rim extending inwardly from the lateral wall, the handle comprising:

a base plate having a first end, a second end and a lower surface;

a first hook connected to the first end of the base plate, the first hook being formed to curve around the inside of the receptacle rim to maintain the base plate in a substantially perpendicular position relative to the longitudinal axis of the receptacle;

a gripping member having a first end and a second end;

a second hook attached to the first end of the gripping member and formed to project substantially perpendicular with respect to the longitudinal axis of the gripping member, the second hook being adapted to receive the receptacle bail such that the bail is positioned substantially above the receptacle rim;

a connecting member connecting the second end of the gripping member to the second end of the base plate so that the gripping member and the base plate are co-planar; and a cam latch pivotally mounted on the lower surface of the base plate and having a first end adapted to rotate into engagement with the outside of the cylindrical wall and to squeeze the wall and rim between the first hook and the cam latch first end.

2. The detachable handle of claim 1 which further comprises:

a handle covering is attached around the gripping member:

the handle covering having an underside surface; and at least one notch defined by the underside surface of the handle covering.

3. The detachable handle of claim 2 wherein:

the second hook has an outside surface; and the handle covering is attached over the outside surface of the second hook.

4. The detachable handle of claim 1 which further comprises:

a hanging ring removably mounted to the remote end of the second hook.

5. The detachable handle of claim 1 wherein the cam latch further comprises:

an arcuate stop attached to the cam latch adjacent to the point the cam latch is pivotally mounted to the base plate and extending toward the plane of the base plate, the arcuate stop being adapted to arrest the rotational movement of the cam latch when the first end of the cam latch is in engagement with the cylindrical wall;

a hooked grip attached to the second end of the cam latch and extending away from the plane of the base plate.

6. The detachable handle of claim 1 which further comprises:

a brush holding clip removably mounted to the first hook.

7. The detachable handle of claim 1 which further comprises:
 a safety lock pivotally attached adjacent to the second end of the base plate, the safety lock being adapted to pivot over the cam latch.

8. The detachable handle of claim 1 wherein:
 the base plate, the first hook, the gripping member, the second hook, and the connecting member comprise a single unit.

9. The detachable handle of claim 1 which further comprises:
 a reinforcing washer mounted on the lower surface of the base plate so that the reinforcing washer extends along the lower surface of the base plate from the point the cam latch is mounted to the base plate to beyond the point the first hook is connected to the base plate.

10. A detachable handle for a receptacle having an open top, a bail, a lateral cylindrical wall and a rim extending inwardly from the lateral wall, the handle comprising:
 a base plate having a first end, a second end and a lower surface;
 a first hook connected to the first end of the base plate, the first hook being formed to curve around the inside of the receptacle rim to maintain the base plate in a substantially perpendicular position relative to the longitudinal axis of the receptacle;
 a gripping member having a first end and a second end;
 a second hook attached to the first end of the gripping member and formed to project substantially perpendicular with respect to the horizontal axis of the gripping member, the second hook being adapted to receive the receptacle bail such that the bail is positioned substantially above the receptacle rim;
 a connecting member connecting the second end of the gripping member to the second end of the base plate so that the gripping member and the base plate are co-planar;
 a cam latch pivotally mounted on the lower surface of the base plate and having a first end adapted to rotate into engagement with the cylindrical wall and to squeeze the wall and rim between the first hook and the cam latch first end;
 a hooked grip attached to the second end of the cam latch and extending away from the plane of the base plate;
 an arcuate stop attached to the cam latch adjacent to the point the cam latch is pivotally mounted to the base plate and extending toward the plane of the base plate, the arcuate stop being adapted to arrest the rotational movement of the cam latch when the first end of the cam latch is in engagement with the cylindrical wall;
 a safety lock pivotally attached adjacent to the second end of the base plate, the safety lock being adapted to pivot over the cam latch; and
 a reinforcing washer mounted on the lower surface of the base plate so that the reinforcing washer extends along the lower surface of the base plate from the point the cam latch is mounted to the base plate to beyond the point the first hook is connected to the base plate.

* * * * *